US006630189B2

(12) United States Patent
Sugiura et al.

(10) Patent No.: US 6,630,189 B2
(45) Date of Patent: Oct. 7, 2003

(54) SOLID-LIQUID FRACTIONATION PROCESS OF OIL COMPOSITION

(75) Inventors: Masakatsu Sugiura, Kashima-gun (JP); Minoru Kase, Kashima-gun (JP); Hiroaki Yamaguchi, Kashima-gun (JP); Naoto Yamada, Kashima-gun (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/900,053

(22) Filed: Jul. 9, 2001

(65) Prior Publication Data

US 2002/0025370 A1 Feb. 28, 2002

(30) Foreign Application Priority Data

Jul. 13, 2000 (JP) ....................................... 2000-212418

(51) Int. Cl.[7] .................................................. A23D 9/04

(52) U.S. Cl. .................... 426/330.6; 426/417; 426/489; 426/495; 426/604; 554/30; 196/139

(58) Field of Search ................................ 426/602, 604, 426/417, 478, 489, 490, 495, 330.6

(56) References Cited

U.S. PATENT DOCUMENTS

| | | | |
|---|---|---|---|
| 4,018,806 | A | 4/1977 | Wyness et al. |
| 5,401,867 | A | 3/1995 | Sitzmann et al. |
| 5,952,518 | A | 9/1999 | Sugiura et al. |
| 6,337,414 | B1 | 1/2002 | Sugiura et al. |

FOREIGN PATENT DOCUMENTS

| | | |
|---|---|---|
| FR | 1 218 563 | 5/1960 |
| JP | 52-65212 | 5/1977 |
| JP | 63-122793 | 5/1988 |
| JP | 1-117845 | 5/1989 |
| JP | 1-289897 | 11/1989 |
| JP | 3-31397 | 2/1991 |
| JP | 4-300828 | 10/1992 |
| JP | 8-34990 | 2/1996 |
| JP | 11-106782 | 4/1999 |
| WO | WO 99/07812 | 2/1999 |

OTHER PUBLICATIONS

Gunstone, F.D. 1986. The Lipid Handbook. Chapman and Hall, New York, p. 98–99.*

T. Abeshima, Yu Kagaku (Oil Chemistry), vol. 28, pp. 700–708, "Fractionation Techniques of Oils and Fats", 1979 (with partial English translation).

K. G. Berger, Oil Palm News, vol. 22, pp. 10–18, "Some Theoretical and Practical Aspects of Fractionation of Palm Oil", 1997.

* cited by examiner

*Primary Examiner*—Carolyn Paden
(74) *Attorney, Agent, or Firm*—Oblon, Spivak, McClelland, Maier & Neustadt, P.C.

(57) ABSTRACT

A process for fractionating an oil composition containing at least 50% by weight of partial diglycerides into a solid portion and a liquid portion, which includes dissolving an emulsifier in the oil composition, cooling the solution to deposit crystals and then conducting solid-liquid separation. The process permits easily fractionating the oil composition into a solid oil composition and a liquid oil composition.

18 Claims, No Drawings

SOLID-LIQUID FRACTIONATION PROCESS OF OIL COMPOSITION

BACKGROUND OF THE INVENTION

1. Field of the Invention

The present invention relates to a process for separating and preparing a solid oil or fat (hereafter referred to as "oil" merely) composition and a liquid oil composition from an oil composition containing at least 50% by weight of partial glycerides.

2. Description of the Background Art

From the healthy inclination in recent years, a high attention is paid to prevention of increase in body weight to prevent obesity. However, it is being clarified from the results of researches in recent years that not only the prevention of increase in body weight, but also decrease in body fat, particularly, visceral fat is effective to prevent and improve various diseases such as hypofunction of heart, hypertension and arteriosclerosis. It was found that diglycerides having a saturated or unsaturated acyl group having 12 to 22 carbon atoms as a constitutive acyl group are useful as agent for preventing and treating fatty liver (Japanese Patent Application Laid-Open Nos. 300828/1992).

Such diglycerides and monoglycerides (hereinafter referred to as partial glycerides) can be prepared by an ester exchange reaction of oil and fat (hereafter referred to as "oil" merely) such as soybean oil or rapeseed oil with glycerol, an esterification reaction of a fatty acid derived from such an oil and obtained by hydrolysis thereof with glycerol, or the like and purification treatments such as molecular distillation and deodorization.

An oil composition containing partial glycerides prepared by such a process is a mixture of glycerol fatty acid esters having acyl groups of various chain lengths. In order to achieve the inhibitory effect of the diglycerides on accumulation of body fat by daily eating habits, it is necessary replace oil (triglyceride) usually ate by the diglyceride. In order to do so, there are 2 methods. One is to use the diglyceride as a cooking oil in place of usual cooking oil (salad oil). The other is to eat processed food such as mayonnaise, margarine or fry making use of the diglyceride in place of the oil.

Oils different in melting point have been used in these foods from the viewpoints of the place used, flavor and mouth feel, shelf stability and the like, and low-boiling oil and high-boiling oil have been used properly.

For example, salad oil undergoes no crystallization of oil even in a refrigerator or under low-temperature conditions in winter. However, diglyceride is higher in melting point than triglyceride from the viewpoint of structure, and so it crystallizes at a low temperature. Therefore, the glyceride fails to take out of a bottle, or has a disadvantage from the viewpoint of appearance. In addition, when the diglyceride is used as an oil material for mayonnaise or dressing, which may be stored in a refrigerator, as it is, the diglyceride crystallizes, and so the emulsion is solidified, or oil-off (separation of the oil material) occurs. The diglyceride is generally prepared from a general-purpose animal or vegetable oil. Even when rapeseed oil or the like, which contains saturated fatty acids only in a small amount, is used as a raw material for the purpose of lowering the melting point of the resulting diglyceride, the glyceride crystallizes in a refrigerator (at 5° C.) to solidify. The melting point of rapeseed oil is about −5° C., while the melting point of the diglyceride prepared by using the rapeseed oil as a raw material is about 15° C. Accordingly, it has been necessary to remove the high-melting portion of the diglyceride by fractionation to lower the melting point. The fractionated high-melting portion can be used as an oil for bread, fry, chocolate, etc., of which a high melting point is required, as it is.

The nutrition researches of such diglycerides have been made clear in recent years, and the low-melting portion and the high-melting portion thereof have been required to be fractionated. However, in the prior art, there are examples where diglycerides are concentrated or removed from a glyceride mixture by using a solvent (Japanese Patent Application Laid-Open Nos. 65212/1977, 122793/1988, 117845/1989 and 34990/1996, etc.), but there is no example where a high-melting diglyceride and a low-melting diglyceride are fractionated from high-concentration diglycerides. The reason for it is that high-purity diglycerides heretofore marketed from emulsifier makers are those having a melting point of at least 20° C., such as stearic acid diglyceride and oleic acid diglyceride, and they are used as lipophilic emulsifiers by incorporating them in a small amount into an oil and can be completely dissolved in the oil even when their melting points are high, and so no diglyceride having a melting point of 20° C. or lower is required.

Taking the fractionation process of the low-melting portion and the high-melting portion into consideration as described above, separation by chromatography and distillation are considered. However, such processes involve problems of low productivity, high cost, deterioration of quality, etc.

In order to fractionate partial glycerides into a solid portion and a liquid potion, it is necessary to cool the partial glycerides to crystallize a high-melting part thereof. There have been proposed a process in which a lipophilic polyglycerol fatty acid ester is added to an oil to fractionate it into a solid portion and a liquid potion (Japanese Patent Application Laid-Open Nos. 289897/1989 and 31397/1991), a process in which an emulsifier is added to fatty acids to remove a crystallized portion (Japanese Patent Application Laid-Open No. 106782/1999) and the like. However, diglycerides and monoglycerides are treated as impurities which inhibit the crystallization of oil (Yu Kagaku (Oil Chemistry), 28, 700–708 (1979); and Oil Palm News, 22, 10–18 (1997)), and the diglycerides are considered to be hard to be crystallized and, particularly, difficult to dry-fractionate them without using any solvent.

SUMMARY OF THE INVENTION

It is an object of the present invention to provide a process for fractionate an oil composition containing at least 50% by weight of partial glycerides into a solid portion and a liquid portion, by which these problems can be solved.

In fact, in fractionation of palm oil making use of a dry fractionation process, or wintering for preparation of salad oil, crystals deposited by simply cooling are firm, and a crystal slurry thereof is fluid and can be easily separated into a solid portion and a liquid portion by filtration or centrifugation, while a crystal slurry obtained by simply cooling high-concentration diglycerides is not fluid and cannot be separately into a solid portion and a liquid portion under conditions of ordinary filtration or centrifugation, resulting in a failure to provide a liquid portion. As described above, the oil and the partial glycerides are entirely different from each other in crystal properties, and fractionation becomes more difficult as the content of the partial glycerides increases. However, it has been found that in an oil composition containing at least 50% by weight of partial diglycerides, solid-liquid separation becomes feasible by cooling the oil composition to deposit crystals only in the case where an emulsifier is added thereto. It has been thereby found that the oil composition containing the partial glycerides can be separated into a solid portion and a liquid portion with low energy under mild conditions at low cost without using any solvent.

According to the present invention, there is thus provided a process for fractionating an oil composition containing at least 50% by weight of partial diglycerides into a solid portion and a liquid portion, which comprises dissolving an emulsifier in the oil composition, cooling the solution to deposit crystals and then conducting solid-liquid separation.

DETAILED DESCRIPTION OF THE PREFERRED EMBODIMENTS

The oil composition containing at least 50% by weight (hereafter indicated merely by "%") of partial glycerides used in the present invention is prepared by causing an alkali catalyst or lipase to act on an oil having the intended constitutive fatty acids and glycerol to conduct an ester exchange reaction, or by causing an alkali catalyst or lipase to act on a mixture of the intended constitutive fatty acids or esters thereof obtained by hydrolysis of an oil, and glycerol to conduct an esterification reaction. Examples of the oil include vegetable oils such as soybean oil, rapeseed oil, sunflower oil, safflower oil, linseed oil, perilla oil, palm oil, rice oil and corn oil; an animal oils such as beef tallow and fish oil; and mixed oils, hardened oils, fractionated oils and random transesterified oils thereof. The number of carbon atoms of acyl groups constituting the partial glycerides is preferably 8 to 24, particularly 16 to 22. In order to lower the melting point of a liquid portion to be obtained by solid-liquid separation, the content of acyl groups derived from palmitic acid and stearic acid is preferably at most 20%, particularly at most 15% in total.

The content of the partial glycerides in the oil composition containing the partial glycerides is at least 50%, preferably at least 70%, particularly higher than 80%. The partial glycerides are preferably diglycerides, and the content of monoglycerides is preferably at most 5%, particularly at most 2%. The content of free fatty acids is preferably at most 5%, particularly at most 2% from the viewpoint of improving flavor of the oil composition. The remainder is composed of triglycerides, and the content thereof is preferably 1 to 50%, particularly 2 to 20% from the viewpoint of fractionation operation.

An emulsifier is added to the oil composition containing at least 50% of the partial glycerides thus prepared, and the mixture is heated, as needed, to dissolve the emulsifier in the oil composition.

Examples of the emulsifier used in the present invention include polyol fatty acid esters, salts of stearyl lactate, stearyl citrate, cholic acid (salts), etc., with those having a melting point of 20 to 40° C. being preferred. Particularly preferred emulsifiers are polyol fatty acid esters. Examples of the polyol fatty acid esters include glycerol fatty acid monoesters, glycerol organic acid fatty acid esters (organic acid: acetic acid, lactic acid, citric acid, succinic acid, diacetyltartaric acid or the like), polyglycerol condensed ricinoleic acid esters, polyglycerol fatty acid esters, sucrose fatty acid esters, sorbitan fatty acid esters, polyoxyethylene sorbitan fatty acid esters, propylene glycol fatty acid esters and phospholipids, with polyglycerol fatty acid esters, sucrose fatty acid esters and sorbitan fatty acid esters being preferred.

The acyl groups in the polyol fatty acid ester are saturated or unsaturated acryl groups having 12 to 22 carbon atoms, preferably 12 to 18 carbon atoms, with mixtures of the saturated and unsaturated acyl groups being particularly preferred. Specifically, a mixed acyl group composed of a saturated acyl group having 12 to 18 carbon atoms and an unsaturated acyl group having 18 carbon atoms is preferred. The content of acyl groups having less than 12 carbon atoms is preferably at most 1% based on all the constitutive acyl groups of the polyol fatty acid ester.

Among the polyol fatty acid esters, polyglycerol fatty acid esters are particularly preferred, with those having an average polymerization degree of 4 to 15, preferably 8 to 12 and an esterification degree of at least 70% being further preferred.

Further, the polyol fatty acid ester preferably has an HLB (according to Gfiffin's equation) of at most 7 and a melting point ranging from 20 to 40° C. from the viewpoint of convenient fractionation of the oil composition containing at least 50% of the partial glycerides.

With respect to the mixing proportion of the oil composition containing at least 50% of the partial glycerides to the emulsifier, it is preferred that the emulsifier be mixed in a proportion of 0.001 to 5 parts by weight, preferably 0.05 to 0.5 parts by weight, particularly 0.1 to 0.3 parts by weight per 100 parts by weight of the oil composition containing the partial glycerides from the viewpoint of sure fractionation.

A mixture of the oil composition containing at least 50% of the partial glycerides and the emulsifier is then heated, as needed, to dissolve the emulsifier therein. In this case, the temperature is preferably controlled to 20 to 80° C., more preferably 30 to 60° C. The melting point of the emulsifier, particularly, the polyol fatty acid ester used herein is preferably higher by 3 to 25° C., more preferably 5 to 20° C. than that of the oil composition containing at least 50% of the partial glycerides to be fractionated.

The oil composition containing at least 50% of the partial glycerides, in which the polyol fatty acid ester has been dissolved, is mixed for at least 1 minute, preferably 3 to 30 minutes in a temperature range in which no crystal is deposited, for example, at a temperature of 15 to 80° C., preferably 20 to 60° C., and then cooled at a cooling rate of 0.1 to 10° C./hr, preferably 1 to 5° C./hr, particularly 1 to 3° C./hr to deposit a high-melting diglyceride containing potion in a high-melting portion (solid oil composition) by the crystal-adjusting effect based on the polyol fatty acid ester, thereby growing the crystals thereof.

After the temperature of the mixture reaches a temperature at which the desired high-melting portion is fully deposited, the mixture was aged for 10 to 600 minutes, preferably 30 to 300 minutes. Thereafter, the high-melting portion and the low-melting portion are fractionated from the mixture by a method of filtration under pressure, vacuum filtration, centrifugation, treatment with a membrane, or the like. The method by filtration is preferred because the yield of the liquid oil composition becomes higher.

As described above, the oil composition containing at least 50% of the partial glycerides according to the present invention is preferably fractionated into solid and liquid portions without using any solvent.

EXAMPLE 1

After a 4-necked flask was charged with raw oil (2,500 g), a nonselective lipase ("Lipase OF", product of Meito Sangyo Co., Ltd.; 1.3 g) and water (2,500 g) to conduct hydrolysis at 40° C. for 6 hours with stirring under a nitrogen atmosphere, an oil phase is separated by centrifugation. This reaction product (2,000 g) of the oil phase, glycerol (330 g) and a 1,3-position-selective, immobilized lipase ("Lipozyme IM", product of Novo Nordisk Bioindustry Co.; 200 g) were mixed to conduct an esterification reaction for 5 hours under conditions of 40° C. and 4 hPa. The resultant reaction product was subjected to a molecular distillation treatment and a deodorizing treatment to obtain a partial glyceride-containing oil composition (1,360 g) having a composition shown in Table 1. A polyol fatty acid ester (0.2 g) or no polyol fatty acid ester was then added to portions (each 100 g) of the partial glyceride-containing oil composition to heat them to 40° C. (to 60° C. in Invention Product 4), thereby preparing uniform liquids as a whole. Thereafter, the liquids were cooled to 5° C. at a cooling rate of 2° C./hr and a stirring speed of 10 rpm and then left at rest for 2 hours.

The resultant crystal slurries were separately fractionated into a solid oil composition and a liquid oil composition by a suction filtration method. The compositions of the liquid oil compositions are shown in Table 2.

No. 700 P-2: Caprylic acid monoglyceride, product of Taiyo Kagaku (Chemical) Co., Ltd., HLB: 7.2 melting point: 15° C.;

No. 61 NN: Sorbitan stearate, product of Taiyo Kagaku (Chemical) Co., Ltd., HLB: 6.2, melting point: 56° C.

The invention products 1 to 5 are all liquid oil compositions, and no deposition of crystals was observed even when they were left at rest at 5° C. for 1 hour. In the comparative products, the crystal slurries gelled, and no liquid oil composition could not be provided. Therefore, the partial glyceride-containing oil compositions shown in Table 1 were respectively stored at 5° C. As a result, both oil compositions derived from sunflower oil and soybean oil deposited crystals at 5° C. to gel. In particular, the oil composition making use of soybean oil was solidified in a bottle for salad oil and could not be taken out of the bottle.

Comparative Example

Sunflower oil (81 parts by weight) as a raw oil was added to the partial glyceride-containing oil composition (29 parts by weight) derived from sunflower oil shown in Table 1 to

TABLE 1

Compositions and melting points of partial glyceride-containing oil compositions

| Raw oil | Composition: Fatty acid | Monoglyceride | Diglyceride | Triglyceride | Saturated fatty acid $C_{16}$ + $C_{18}$ % | Melting point ° C. |
|---|---|---|---|---|---|---|
| Sunflower oil | 0.2 | 1.6 | 86.3 | 11.9 | 10.5 | 15 |
| Soybean oil | 0.1 | 1.1 | 86.0 | 12.8 | 14.3 | 22 |

TABLE 2

Compositions of liquid oil compositions after solid-liquid fractionation

| | Raw oil | Composition %: Fatty acid | Mono-glyceride | Di-glyceride | Tri-glyceride | Saturated fatty acid $C_{16}$ + $C_{18}$ % | Polyol fatty acid ester | Yield of liquid portion % | Melting point ° C.: Before fractionation | Liquid portion | Solid portion |
|---|---|---|---|---|---|---|---|---|---|---|---|
| Invention product 1 | Sunflower oil | 0.1 | 1.6 | 86.2 | 12.2 | 7.4 | THL 15 | 68.5 | 15 | 3 | 24 |
| Invention product 2 | Sunflower oil | 0.1 | 1.5 | 86.1 | 12.3 | 7.2 | Synthetic product | 76.5 | 15 | 3 | 25 |
| Invention product 3 | Sunflower oil | 0.1 | 1.6 | 85.3 | 13.1 | 7.6 | No. 700 P-2 | 31.5 | 15 | 4 | 20 |
| Invention product 4 | Sunflower oil | 0.1 | 1.4 | 85.7 | 12.8 | 7.5 | No. 61 NN | 24.5 | 15 | 4 | 18 |
| Invention product 5 | Soybean oil | 0.1 | 1.2 | 84.1 | 14.6 | 8.3 | Synthetic product | 53.7 | 22 | 2 | 26 |
| Comparative product 1 | Sunflower oil | | | | | | — | Gelled and failed to fractionate | 15 | — | — |
| Comparative product 2 | Soybean oil | | | | | | — | | 22 | — | — |

(Note) Polyol fatty acid ester:
THL 15: Mixed fatty acid ester of decaglycerol, product of Sakamoto Yakuhin Kogyo Co., Ltd., HLB: 3, melting point: 31° C.;
Synthetic product: Decaglycerol palmitate (40%) oleate (60%); HLB:3, melting point: 29° C.;
No. 700 P-2: Caprylic acid monoglyceride, product of Taiyo Kagaku (Chemical) Co., Ltd., HLB: 7.2, melting point: 15° C.;
No. 61 NN: Sorbitan stearate, product of Taiyo Kagaku (Chemical) Co., Ltd., HLB: 6.2, melting point: 56° C.

(Note) Polyol fatty acid ester:

THL15: Mixed fatty acid ester of decaglycerol, product of Sakamoto Yakuhin Kogyo Co., Ltd., HLB 3, melting point: 31° C.;

Synthetic product: Decaglycerol palmitate (40%) oleate (60%); HLB:3, melting point: 29° C.;

prepare an oil composition containing 25% of diglycerides. The above-described synthetic product (0.2 g) of the polyol fatty acid ester was added to this oil composition (100 g), and the mixture was heated to 40° C., thereby preparing a uniform liquid as a whole. Thereafter, the liquid was cooled at a cooling rate of 2° C./hr and a stirring speed of 10 rpm. Since this oil composition contained about 74% of triglycerides, the melting point thereof was low, and so no crystal was deposited by −4° C. Therefore, the liquid was cooled to −10° C. and then left at rest for 2 hours. The resultant crystal slurry gelled, and crystals thereof were too fine to collect them by filtration.

As described above, according to the present invention, oil compositions comprising at least 50% of partial glycerides can be easily fractionated into a solid oil composition and a liquid oil composition.

What is claimed is:

1. A process for fractionating an oil composition comprising a solid portion and a liquid portion, which comprises adding and dissolving an emulsifier in the oil composition, cooling the solution to deposit crystals and then conducting solid-liquid separation, wherein said oil composition comprises at least 50% by weight of partial glycerides prior to the addition of the emulsifier.

2. The process according to claim 1, wherein the content of acyl groups derived from palmitic acid and stearic acid in all the acyl groups of the oil composition is at most 20% in total.

3. The process according to claim 1 or 2, wherein said emulsifier is a polyol fatty acid ester.

4. The process according to claim 3, wherein said polyol fatty acid preferably has an HLB of at most 7 and a melting point of 20 to 40° C.

5. The process according to claim 3, wherein the melting point of said polyol fatty acid ester is higher by 3 to 25° C. than that of said oil composition comprising at least 50% of the partial glycerides.

6. The process according to claim 3, wherein acyl groups of the polyol fatty acid ester are mixed acyl groups having 12 to 18 carbon atoms, and the content of acyl groups having less than 12 carbon atoms is at most 1% based on all the constitutive acyl groups of the polyol fatty acid ester.

7. The process according to claim 3, wherein said polyol fatty acid ester is a polyglycerol fatty acid ester.

8. The method of claim 3, wherein acyl groups of the polyol fatty acid ester are acyl groups having 12 to 22 carbon atoms.

9. The method of claim 1, wherein said emulsifier is selected from the group consisting of salts of stearyl lactate, stearyl citrate, cholic acid, cholic acid salts, polyglycerol condensed ricinoleic acid esters, polyglycerol fatty acid esters, sucrose fatty acid esters, sorbitan fatty acid esters, polyoxyethylene sorbitan fatty acid esters, propylene glycol fatty acid ester, phospholipids and a mixture thereof.

10. The method of claim 1, wherein said emulsifier is selected from the group consisting of polyglycerol fatty acid esters, sucrose fatty acid esters, sorbitan fatty acid esters and a mixture thereof.

11. The method of claim 1, wherein said partial glyceride is comprised of acyl groups having 8 to 24 carbon atoms.

12. The method of claim 1, wherein said oil composition is comprised of at least 70% by weight of partial glycerides.

13. The method of claim 1, wherein a monoglyceride content of said partial glyceride is at most 5% by weight.

14. The method of claim 1, wherein a monoglyceride content of said partial glyceride is at most 2% by weight.

15. The method of claim 1, wherein a free fatty acid content of said partial glyceride is at most 5% by weight.

16. The method of claim 1, wherein said emulsifier is mixed in a proportion of 0.001 to 5 parts by weight per 100 parts by weight of said oil composition.

17. The method of claim 1, wherein said emulsifier is mixed in a proportion of 0.05 to 0.5 parts by weight per 100 parts by weight of said oil composition.

18. The method of claim 1, wherein said emulsifier is mixed in a proportion of 0.1 to 0.3 parts by weight per 100 parts by weight of said oil composition.

* * * * *